United States Patent
Peterson et al.

(10) Patent No.: US 7,435,904 B2
(45) Date of Patent: Oct. 14, 2008

(54) WIRING HARNESS CLIP AND METHOD OF MAKING SAME FROM AN EXTRUDABLE BLANK

(75) Inventors: David R. Peterson, Aurora, OH (US); Randall S Cvelbar, Hubbard, OH (US); Matthew D Laws, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/403,269

(22) Filed: Apr. 13, 2006

(65) Prior Publication Data

US 2007/0240895 A1    Oct. 18, 2007

(51) Int. Cl.
H02G 3/04    (2006.01)

(52) U.S. Cl. ............... 174/72 A; 174/135; 174/138 G; 248/68.1

(58) Field of Classification Search ............... 174/72 A, 174/135, 480, 72 TR, 38 G; 248/68.1, 71, 248/74.3, 73, 74.2; 29/592, 592.1; 156/51
See application file for complete search history.

(56) References Cited

U.S. PATENT DOCUMENTS

| | | | |
|---|---|---|---|
| 2,931,851 A | 4/1960 | Sims | |
| 3,210,030 A * | 10/1965 | Ramsey et al. | 248/71 |
| 4,871,134 A | 10/1989 | Oikawa | |
| 5,160,812 A * | 11/1992 | Takahashi et al. | 174/135 |
| 5,362,018 A | 11/1994 | Darr et al. | |
| 5,597,280 A * | 1/1997 | Stern | 248/71 |
| 5,922,155 A * | 7/1999 | Clouet et al. | 156/51 |
| 6,311,934 B1 * | 11/2001 | Fujii et al. | 248/73 |
| 6,417,451 B1 * | 7/2002 | Uchiyama | 174/72 A |
| 6,504,101 B2 * | 1/2003 | Kondoh | 174/135 |
| 6,610,929 B1 * | 8/2003 | Motokawa | 174/72 A |
| 6,827,316 B1 * | 12/2004 | Arai | 248/68.1 |
| 7,045,715 B2 * | 5/2006 | Ono | 174/72 A |

* cited by examiner

Primary Examiner—Angel R Estrada
(74) Attorney, Agent, or Firm—David P. Wood

(57) ABSTRACT

An extrudable wiring harness clip has an elongate base for taping the wiring harness clip to a bundle of cables and an integral self expanding head for attaching the bundle of cables to a support panel or the like. The extrudable wiring harness clip has a constant cross section extending from a front face to a rear face that are preferably parallel to each other. The bottom surface of the elongate base is preferably flat or at least not curved in a direction that is parallel to the length of the elongate base. The extrudable wiring harness clip is made by slicing a portion from an extrusion strip.

12 Claims, 1 Drawing Sheet

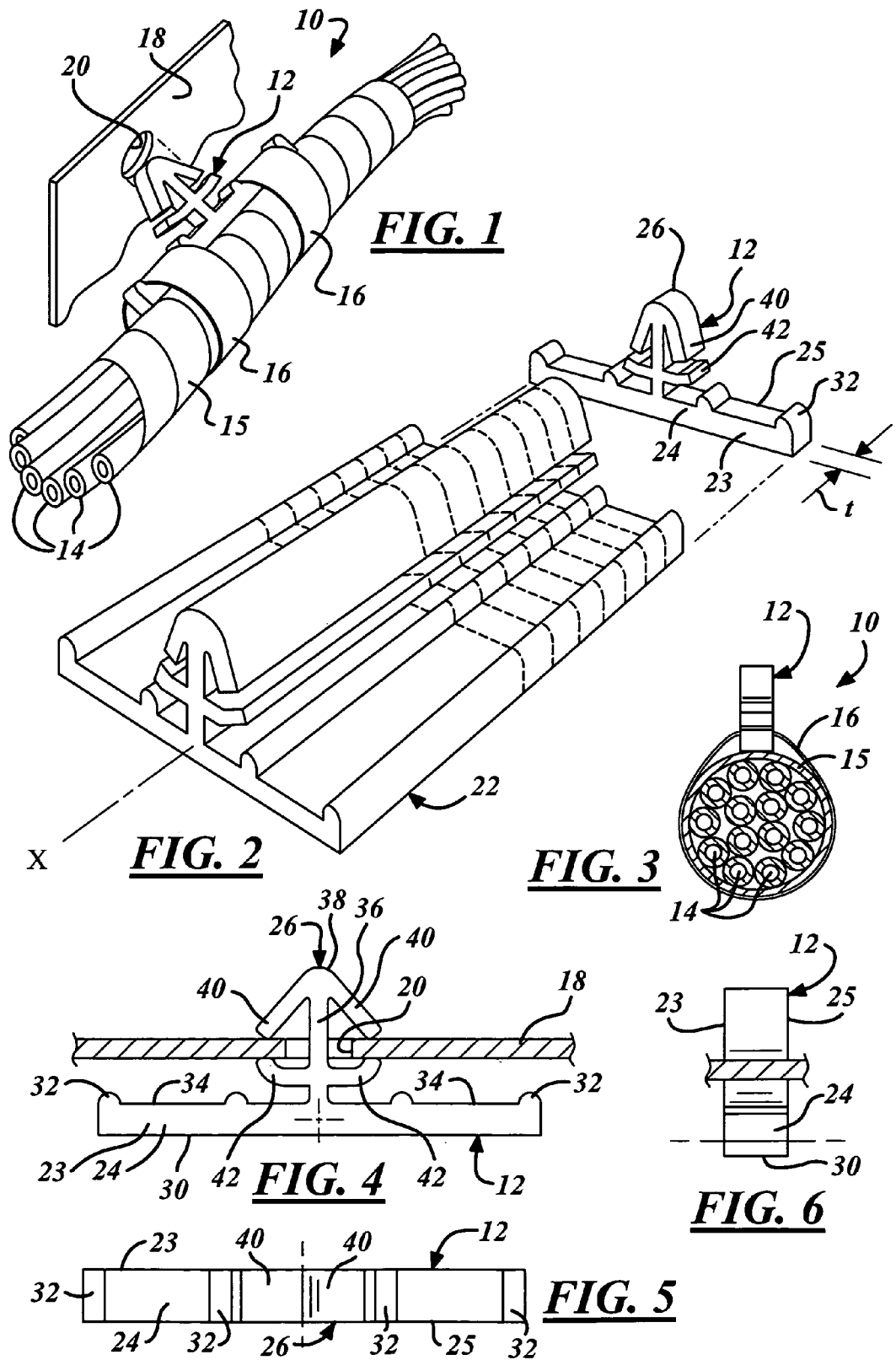

WIRING HARNESS CLIP AND METHOD OF MAKING SAME FROM AN EXTRUDABLE BLANK

FIELD OF THE INVENTION

This invention relates generally to a wiring harness clip and a method of making the wiring harness clip.

BACKGROUND OF THE INVENTION

U.S. Pat. No. 2,931,851 granted to Robert H. Sims Apr. 5, 1960, and U.S. Pat. No. 3,210,030 granted to Charles W. Ramsey et al. Oct. 5, 1965, disclose typical wiring harness clips that are attached at predetermined locations along a wiring harness to secure the wiring harness to support panels and the like existing along the route of the wiring harness. Each of these known wiring harness clips comprise an elongate base having a relatively wide arcuate bottom surface and a self expanding head which is integrally attached to a central portion of the elongate base. The wiring harness clip is attached to the wiring harness by placing the arcuate bottom surface against a bundle of wires forming part of the wiring harness and taping the elongate base to the bundle of wires as shown in FIG. 1 of the '851 Sims patent. The wiring harness clip is then attached to a support panel or the like, for instance by inserting the self expanding head through a hole in the support panel.

U.S. Pat. No. 4,871,134 granted to Ryuetsu Oikawa discloses several wiring harness clips that are attached at predetermined locations along a wiring harness to secure the wiring harness to support panels and the like existing along the route of the wiring harness. Each of these known wiring harness clips comprise an elongate base having an arcuate or flat surface that is placed against the wiring harness and then attached by taping the elongate base to a bundle of wires forming part of the wiring harness. The wiring harness clip is then attached to a support panel or the like, either by a clamp shown in FIGS. 1-4 of the Okiawa '134 that is adapted to be secured to a retainer on a support panel (not shown) or by a bolt (not shown) that extends through a hole of the wiring harness clip as shown in FIG. 5 of the Oikawa '134 patent.

U.S. Pat. No. 5,362,018 granted to Christopher J. Darr et al discloses a T-shaped molded clip for a wiring harness having an elongate base that can be taped to a wiring harness. The base includes a web or webs so that the base can be bent to either side for attaching the elongate base to a wiring harness.

While these type of clips have been used successfully in the automotive industry for many years, the shapes of the clips require an injection molding process to manufacture the clips, which is a relatively expensive procedure.

SUMMARY OF THE INVENTION

In one aspect, this invention provides a wiring harness clip that has an elongate base for taping the wiring harness clip to a bundle of wires and an attachment ear with a hole for attaching the bundle of wires to a support panel or the like, that is shaped for manufacture from extruded blank. Thus the wiring harness clip of the invention reduces the manufacturing cost by using an extrusion strip and eliminating an injection mold in manufacturing the wiring harness clip which is another aspect of the invention.

BRIEF DESCRIPTION OF THE DRAWING

FIG. 1 is a perspective view of an assembly having a wiring harness clip of the invention;

FIG. 2 is a perspective view of the wiring harness clip of FIG. 1 in the process of being manufactured from an extrusion strip;

FIG. 3 is an end view of the assembly of FIG. 1;

FIG. 4 is a front view of the wiring harness clip of FIG. 1 formed from the extrusion strip shown in FIG. 2 and applied to a support panel;

FIG. 5 is a top view of the wiring harness clip of FIG. 1, and

FIG. 6 is an end view of the wiring harness clip of FIG. 1 applied to a support panel as shown in FIG. 4.

DETAILED DESCRIPTION OF PREFERRED EMBODIMENT

FIG. 1 is a perspective view of an assembly 10 having a wiring harness clip 12 of the invention attached to a bundle of insulated electric cables 14 by tape 16 wrapped around portions of the wiring harness clip 12 and the bundle of insulated electric cables 14. Tape 16 may be wrapped directly around the bundle of electric cables 14 or the bundle of insulated electric cables 14 may be prewrapped with an underlayer of tape 15 as shown in FIGS. 1 and 3. Wiring harness clip 12 is shaped to attach the bundle of insulated electric cables 14 to a support panel 18 using a hole 20 that extends through the support panel.

Wiring harness clip 12 is made from an extrusion strip 22 of constant cross section that is extruded in an extrusion strip direction x shown in FIG. 2. Wiring harness clip 12 is formed, preferably simply by slicing the wiring harness clip 12 from an end of the extrusion strip in a direction transverse to the extrusion strip direction x resulting in a wiring harness clip that has a constant cross section that extends from a front face 23 to a rear face 25. Several more wiring harness clips are then made by successive slices as indicated by the dashed lines in FIG. 2. The wiring harness clip 12 is illustrated as having a substantially uniform thickness of and sliced in a direction perpendicular to the extrusion strip direction x which results in a rectangular footprint as shown in FIG. 5. However, it should be understood that wiring harness clips of other shapes can be sliced from the extrusion strip 22. For instance, a wiring harness clip having a footprint in the shape of a parallelogram can be formed by successive parallel slices that are simply transverse but not perpendicular to the extrusion strip direction x. Another alternative is a wiring harness clip that varies in thickness from end to end or from top to bottom, both of which can be formed by successive slices that are not parallel. In fact an almost infinite variety of shapes can be made by simple slicing operations so long as the constant cross section of extrusion strip 22 is retained.

FIG. 4 is a front view of the wiring harness clip 12 formed from the extrusion strip 22 shown in FIG. 2 and attached to support panel 18 using the hole 20 that extends through the support panel. The taped bundle of insulated electric cables 16 has been omitted for clarity of the panel attachment portions of the wiring harness clip 12.

The extrudable wiring harness clip 12 comprises an elongate base 24 for taping the wiring harness clip 12 to the bundle of electric cables 14, and an attachment portion 26 for attaching the wiring harness clip 12 to the support panel 18 using the hole 20 that extends through the support panel. Known art wiring harness clips have elongate bodies with wide and concave bottom surfaces s for engaging the generally round bundle of electric cables, which require a relatively expensive injection molding process for manufacture. See for instance, the Sims '851 and Ramsey et al. '030 patents discussed above. However, the elongate base 24 of the invention has a comparatively thin and flat bottom surface 30 for engaging the generally round bundle of electric cables as shown in FIGS. 3, 4 and 6. The comparatively thin and flat bottom surface 30 in fact preferably has the same thickness t as the rest of the wiring harness clip 12 to maximize use of extrusion strip 22 while avoiding any wasted material.

The elongate base 24 preferably includes four spaced ribs 32 on its top surface that are parallel to the extrusion strip direction x. These four ribs 32 define two taping zones 34 for wrapping tape 16 around the bundle of electric cables 14 and the wiring harness clip 12 as best shown in FIG. 1.

The attachment portion 26 comprises a stem 36 having an integral self expanding head 38 having diverging wings 40 that extend back toward the elongate base 24, and medial stop arms 42 below the diverging wings 40. Stop arms 42 extend outwardly from stem 36 and have curled tips 44 aligned with the respective tips of the diverging wings 40. The wiring harness clip 12 is attached to the support panel 18 by inserting the head 38 through the hole 20 and collapsing the diverging wings 40 until the medial curled tips 44 of stop arms 42 engage the front of panel 18 whereupon wings 40 expand and engage the back side of panel 18. When installed stop arms 42 and wings 40 preferably biasingly engage the respective front and back sides of panel 18 for attaching the bundle of electrical cables 14 to panel 18 without rattling. Stop arms 42 also preferably hold the bundle of cables 14 away from support panel 18.

The invention provides an extrudable wiring harness clip having an elongate base for taping the wiring harness clip to a bundle of electric cables and an integral self expanding head for attaching the bundle of electric cables to a support panel or the like. The extrudable wiring harness clip has a front face and a rear face and a uniform shape extending from the front face to the rear face. The front face and the rear face may be parallel to each other to avoid material waste. The elongate base has a top surface and a bottom surface, the integral self expanding head being attached to the top surface, and the bottom surface preferably being flat and planar, or at least not curved in a direction parallel to the length of the elongate base 24.

The extrusion strip blank 22 for making the wiring harness clips 12 may be of any extrudable material that produces the required strength for the wiring harness clips. Suitable materials that could be extruded for automotive applications are nylon, polypropylene and polyethylene.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. An extrudable wiring harness clip that is sliced from an extrusion strip comprising:

an elongate base for taping the wiring harness clip to a bundle of cables, and an integral self expanding head attached to the elongate base for attaching the elongate base and the bundle of cables to a support panel, the elongate base having a front face and a rear face, the integral self expanding head having a front face that is coplanar with the front face of the elongate base, and the integral self expanding head having a rear face that is coplanar with the rear face of the elongate base.

2. The extrudable wiring harness clip of claim 1 wherein the extrudable wiring harness clip has a constant cross section that extends from the front face of the elongate base and the coplanar front face of the integral self expanding head to the rear face of the elongate base and the coplanar rear face of the integral self expanding head.

3. The extrudable wiring harness clip of claim 1 wherein the extrudable wiring harness clip has a substantially uniform thickness between the front face of the elongate base and the coplanar front face of the integral self expanding head and the rear face of the elongate base and the coplanar rear face of the integral self expanding head.

4. The extrudable wiring harness clip of claim 3 wherein the elingate base has a bottom surface that has the same thickness as the extrudable wiring harness clip and that is not curved in a direction parallel to the length of the elongate base.

5. The extrudable wiring harness clip of claim 4 wherein the bottom surface of the extrudable wiring harness clip is flat and has a rectangular footprint.

6. An extrudable wiring harness clip comprising:

an elongate base for taping the wiring harness clip to a bundle of cables, an integral self expanding head for attaching the elongate base and the bundle of wires to a support panel, the extrudable wiring harness clip having a front face defined by the elongate base and the integral self expanding head and a rear face defined by the elongate base and the integral self expanding head and a constant cross section extending from the front face to the rear face;

the front face and the rear being parallel to each other, the elongate base having a length and a bottom surface that is not curved in a direction the is parallel to the length of the elongate base.

7. The extrudable wiring harness clip of claim 6 wherein the bottom surface is flat and has a rectangular footprint.

8. The extrudable wiring harness clip of claim 6 wherein the self expanding head has a stem, diverging wings extending from the stem toward the elongate base, and stop arms extending outwardly from the stem below the wings.

9. A method of making an extrudable wiring harness clip comprising the steps of:

extruding an extrusion strip of uniform cross section having an elongate base and a self-expanding head that is integrally attached to a mid portion of the elongate base, and slicing the extrudable wiring harness clip from an end of the extrusion strip.

10. The method of making an extrudable wiring harness clip as defined in claim 9 wherein the extrudable wiring harness clip is sliced so as to have a uniform thickness.

11. The method of making an extrudable wiring harness clip as defined in claim 9 wherein the extrusion strip is extruded in an extrusion strip direction, and wherein the extrudable wiring harness clip is sliced from the extrusion strip is in a direction that is perpendicular to the extrusion strip direction so that the extrudable wiring harness clip has a uniform thickness.

12. The method of claim 9 wherein the self-expanding head has a stem, diverging wings extending from the stem toward the elongate base, and stop arms extending outwardly from the stem below the wings.

* * * * *